United States Patent
Beer et al.

(10) Patent No.: US 7,146,605 B2
(45) Date of Patent: Dec. 5, 2006

(54) AUTOMATIC ABSTRACTION OF SOFTWARE SOURCE

(75) Inventors: Ilan Beer, Haifa (IL); Cindy Eisner, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 10/045,007

(22) Filed: Jan. 15, 2002

(65) Prior Publication Data
US 2002/0144236 A1    Oct. 3, 2002

Related U.S. Application Data

(60) Provisional application No. 60/261,539, filed on Jan. 15, 2001.

(51) Int. Cl.
*G06F 9/44* (2006.01)
(52) U.S. Cl. ........................ 717/126; 717/124
(58) Field of Classification Search ........ 717/131–132, 717/124–126, 104–105, 134–135
See application file for complete search history.

(56) References Cited

U.S. PATENT DOCUMENTS

| | | | | |
|---|---|---|---|---|
| 5,394,347 | A * | 2/1995 | Kita et al. | 703/2 |
| 5,481,717 | A * | 1/1996 | Gaboury | 717/126 |
| 5,721,926 | A * | 2/1998 | Tamura | 717/104 |
| 6,209,120 | B1 * | 3/2001 | Kurshan et al. | 716/5 |
| 6,505,342 | B1 * | 1/2003 | Hartmann et al. | 717/104 |
| 6,694,290 | B1 * | 2/2004 | Apfelbaum et al. | 703/22 |
| 6,820,256 | B1 * | 11/2004 | Fleehart et al. | 717/155 |
| 6,853,963 | B1 * | 2/2005 | Apfelbaum et al. | 703/2 |
| 2005/0204341 | A1 * | 9/2005 | Broussard | 717/124 |

OTHER PUBLICATIONS

Cousot et al. "Abstract Interpretation: A Unified Lattice Model for Static Analysis of Programs by Construction or Approximation of Fixpoints" 1977, 4th ACM Symp. Principles of Programing Languages, p. 238-252.*
Martens et al. "Ensuring Global Termination of Partial Deduction while Allowing Flexible Polyvariance" 1995, ICLP 95.*
Anderson et al. "Model Checking Large Software Specifications" Oct. 1996 SIGSOFT'96, p. 156-166.*
Dwyer et al. "Model Checking Graphical User Interfaces Using Abstractions" 1997, 5th AMC SIGSOFT, p. 244-261.*
Wing et al. "Model Checking Software Systems: A Case Study" 1995, SIGSOFT '95, p. 128-139.*
Jackson "Abstract Model Checking of Infinite Specifications" 1994, Lecture Notes on Computer Science vol. 873, p. 519-531.*

(Continued)

*Primary Examiner*—Kakali Chaki
*Assistant Examiner*—Jason Mitchell
(74) *Attorney, Agent, or Firm*—Browdy and Neimark, PLLC

(57) ABSTRACT

A method for verifying software source code that includes references to program variables includes processing the source code to derive a set of next-state functions representing control flow of the source code. The references to the program variables in the source code are replaced with non-deterministic choices in the next-state functions. The next-state functions including the non-deterministic choices are restricted to produce a finite-state model of the control flow. The finite-state model is then verified to find an error in the source code.

27 Claims, 2 Drawing Sheets

OTHER PUBLICATIONS

Esparza, D. Hansel, P. Rossmanith, and S. Schwoon. Efficient algorithms for model checking pushdown systems. In Proc. CAV'00, LNCS 1855, pp. 232-247. Springer, 2000.*

Bouajjani, Esparza, Maler "Reachability Analysis of Pushdown Automata: Application to Model-Checking"; Lecture Notes In Computer Science; vol. 1243, 1997.*

Esparza, Kucera, Schwoon "Model-Checking LTL with Regular Valuations for Pushdown Systems" Lecture Notes In Computer Science; vol. 2215, 2001.*

C. Eisner, "Model Checking SMV", IBM Haifa Research Laboratory, Matam Advanced Technology Center.

Clarke et al., "Model Checking", Chapter 1, MIT Press (1999) pp. 4-6.

Beer et al., "RulesBase: an Industry-Oriented Formal Verification Tool", Proceedings of the Design Automation Conference DAC'96 Las Vegas, Nevada 6 pages, (1996).

Beer et al., "The Temporal Logic Sugar", Proceedings of the Thirteenth International Conference on Computers Aided Verification 13 Pages, (2001).

Beer et al., "On-The-Fly Model Checking of RCTL Formulas", Proceedings of the Tenth International Conference on Computer Aided Verification 11 Pages, (2001).

Corbett et al., "Bandera: Extracting Finite-State Models from Java Source Code", Proceedings of the 22nd International Conference of Software Engineering, 10 Pages (2000).

Holzmann, "Logic Verification of ANSI-C code with SPIN", Proceedings of the Seventh International SPIN workshop, p. 224, (2000).

Havelund et al., "Model Checking Java Programs Using Java Pathfinder", International Journal for Software Tools for Technology Transfer 17 Pages, (2000).

Esparza et al., "Efficient Algorithms for Model Checking Pushdown Systems", Published in Proceedings of Twelfth International Conference on Computer Aided Verification, 16 Pages, (2000).

Demartini et al., "Modeling and Validation of Java Multithreading Application using SPIN", Published in Proceedings of the Fourth International SPIN Workshop 15 Pages, (1998).

Holzmann et al., "Software Modeling Checking: Extracting Verification Models from Source Code", Published in Proceedings of PSTV/FORTE99, 18 Pages, (1999).

McMillan, "Symbolic Model Checking", Kluwer Academic Publishers, Chapter 2, 3, pp. 11-30, (1993).

Eisner, Cindy, "Model Checking the Garbage Collection Mechanism of SMV", Electronic Notes in Theoretical Computer Science. (2001) 55(3):1-15. <URL: http//www.elserver.nl/locate/entcs/volume55.html>.

* cited by examiner

AUTOMATIC ABSTRACTION OF SOFTWARE SOURCE

CROSS-REFERENCE TO RELATED APPLICATION

This application claims the benefit of U.S. Provisional Patent Application 60/261,539, filed Jan. 15, 2001, which is incorporated herein by reference.

FIELD OF THE INVENTION

The present invention relates generally to the use of formal methods in software design and verification, and specifically to symbolic model checking of software code.

BACKGROUND OF THE INVENTION

Model checking is a method of formal verification that is gaining in popularity as a tool for use in designing complex systems, such as integrated circuits. The method is described generally by Clarke et al. in *Model Checking* (MIT Press, 1999), which is incorporated herein by reference. To perform model checking of the design of a device, a user reads the definition and functional specifications of the device and then, based on this information, writes a set of properties $\{\phi_i\}$ (also known as a specification) that the design is expected to fulfill. A model M (also known as an implementation) of the design, which is typically written in a hardware description language, is then verified to ascertain that the model satisfies all of the properties in the set, i.e., $\forall \phi \in \{\phi_i\}$, $M \models \phi$, under all possible input sequences. When a property $\phi$ is found to be false on M, the model checker returns a sequence of states and transitions (a path) that leads to the problematic state of the design. This path is called a counterexample. It can be used by the engineer in understanding and remedying the design defect that led to the failure of the model.

The properties $\{\phi_i\}$ for use in model checking are typically written in a suitable specification language for expressing temporal logic relationships between the inputs and outputs of the device. Such languages are commonly based on a temporal logic, such as Computation Tree Logic (CTL) or Linear Temporal Logic (LTL). Model checking can then be carried out automatically by a symbolic model checking program, such as SMV, as described, for example, by McMillan in *Symbolic Model Checking* (Kluwer Academic Publishers, 1993), which is incorporated herein by reference. Symbolic CTL model checking involves computing the transition-relation (TR) of the model, and then applying the model checking algorithm to verify a given CTL formula.

A number of practical model checking tools are available, among them RuleBase, developed by IBM Corporation. This tool is described by Beer et al. in "RuleBase: an Industry-Oriented Formal Verification Tool," in *Proceedings of the Design Automation Conference DAC'96* (Las Vegas, Nev., 1996), which is incorporated herein by reference. In another article, entitled "On-the-fly Model Checking of RCTL Formulas," in *Proceedings of the Tenth International Conference on Computer Aided Verification* (CAV 1998), which is incorporated here in by reference, Beer et al. define a specification language RCTL, as an extension to the conventional CTL language using regular expressions. RCTL makes it possible to translate many CTL formulas conveniently into state machines having an error state. More recently, Beer et al. have extended RCTL to include further expressions and syntax that are useful in creating formulas for model checking, which they describe in "The Temporal Logic Sugar," *Proceedings of the Thirteenth International Conference on Computer Aided Verification* (CAV 2001), which is incorporated herein by reference.

Although model checking has gained wide acceptance in hardware design, it is still rarely used in mainstream software development. There are two major reasons for the low penetration of model checking in the software field:

(1) The semantics of software programming languages are difficult to translate into models for existing model checkers. By contrast, fully-automatic tools exist for translating gate-level hardware description languages into a form amenable to model checking.

(2) Software programs generally have an infinite number of states, whereas hardware devices can be treated as finite state systems.

The effort to develop new model checkers that address the features of software design is still in its infancy. Such software model checkers are still far from achieving the degree of automation and versatility offered by existing hardware model checkers, such as RuleBase. There is a need for tools that can automatically convert software source code into models that can be handled in a similar way to hardware models, using proven model checking tools.

For this purpose, a number of research groups have developed methods for converting software source code into modeling languages. For example, Demartini et al. describe a method for applying the SPIN model checker to Java programs in "Modeling and Validation of Java Multithreading Applications Using SPIN," published in *Proceedings of the Fourth International SPIN Workshop* (Paris, France, 1998), which is incorporated herein by reference. They use a "Java2Spin" translator tool to convert the Java source code into an abstract formal model expressed in the Promela language used by SPIN. Synchronization among threads is modeled using message queues and global variables. The model complexity is kept low by avoiding explicit modeling of library classes, by letting the user specify which variables need to be modeled and by applying other model reduction techniques. A similar approach is described by Havelund et al. in "Model Checking Java Programs Using Java PathFinder," *International Journal for Software Tools for Technology Transfer* (Springer Verlag, April, 2000), page 366, which is also incorporated herein by reference.

Holzmann et al. describe another method for automated model generation from software code in "Software Model Checking: Extracting Verification Models from Source Code," published in *Proceedings of PSTV/FORTE99* (Kluwer, 1999), page 481, which is incorporated herein by reference. (PSTV stands for "Protocol Specification, Testing and Verification," while FORTE stands for "Formal Description Techniques for Distributed Systems and Communication Protocols.") The authors extract a control-flow skeleton from C language code using a semi-automatic, user-guided procedure, and use a look-up table to convert specific source statements into corresponding Promela modeling code. To produce the final model in Promela, every abstract data object must be formally declared, defining its type and initial value. The user carries out this step by filling in a model template that contains the required data declarations and an outline of the required process declarations. Holzmann describes this method further in "Logic Verification of ANSI-C Code with SPIN," in *Proceedings of the Seventh International SPIN Workshop* (Springer Verlag, 2000), page 224, which is also incorporated herein by reference.

Corbett et al. describe yet another tool for automated model generation in "Bandera: Extracting Finite-state Models from Java Source Code," in *Proceedings of the 22nd International Conference on Software Engineering* (Limerick, Ireland, June, 2000, published by the Association for Computing Machinery), page 439, which is incorporated herein by reference. Bandera has a number of components, including an abstraction engine, which allows the user to reduce the cardinality of data sets associated with variables. It also provides a language for use in specifying abstractions. Bandera generates a low-level intermediate language based on guarded commands, which abstracts common model checker input languages.

Esparza et al. describe the application of model checking to pushdown automata, in "Efficient Algorithms for Model Checking Pushdown Systems," published in *Proceedings of the Twelfth International Conference on Computer Aided Verification (CAV)* (Springer Verlag, 2000), page 232, which is incorporated herein by reference. Pushdown systems are infinite transition systems having configurations of the form (control state, stack content) as their states. The authors use pushdown systems to model sequential programs with procedures by concentrating on the control flow and abstracting away information about data. The model establishes a relation between the control states of a program and the configurations of the corresponding pushdown system. Model checking is then applied to the pushdown system.

SUMMARY OF THE INVENTION

Preferred embodiments of the present invention provide a method for automatic abstraction of software code, to generate a finite-state model that can be verified using existing model checking tools and algorithms.

In these preferred embodiments, program source code is automatically translated into a set of next-state functions, which logically reproduce the control flow of the program. All variables in the next-state functions are eliminated, with the exception of the program counter. References to the variables are replaced where necessary (typically at branches in the control flow) by non-deterministic choices. Propositions assignto_v and useof_v are automatically generated for each variable v, and a proposition callto_f is automatically generated for each function f. The program stack is restricted to a predetermined depth. Thus, the program is reduced to a skeleton that represents all possible control flows of the original program.

The skeleton program has simple semantics, since it contains no variables and thus has no complex data types or pointers. It can be directly represented in a standard modeling language, such as SMV. Because the program counter and the stack are finite, the states of the skeleton program itself are also finite. It can be verified by a hardware model checker in the usual fashion to find those violations of properties in the original program that depend only on the control flow.

Thus, preferred embodiments of the present invention allow certain aspects of substantially any program to be checked in a fully automatic manner. As described in the Background of the Invention, methods known in the art for model checking software code generally require substantial user involvement in creating the model, and are limited by state explosion problems to checking only small programs. The present invention overcomes these limitations by the use of radical abstractions, enabling programs of arbitrary complexity to be translated into finite state models, without the need for any user input in the process. Although the preferred embodiments described herein are limited to finding control flow errors (and thus do not provide full verification of the program under test), they still provide substantial feedback to the user on possible program bugs without requiring the user to spend time and effort constructing abstract models.

There is therefore provided, in accordance with a preferred embodiment of the present invention, a method for verifying software source code that includes references to program variables, the method including:

processing the source code to derive a set of next-state functions representing control flow of the source code;

replacing the references to the program variables in the source code with non-deterministic choices in the next-state functions;

restricting the next-state functions including the non-deterministic choices to produce a finite-state model of the control flow; and verifying the finite-state model to find an error in the source code.

Preferably, processing the source code includes extracting a program counter from the source code, and expressing the next-state functions in terms of the program counter. Further preferably, processing the source code includes expressing the next-state functions with reference to a stack pointer associated with a stack used in running the code, and replacing the program variables includes eliminating substantially all the references to the program variables from the next-state functions, leaving the next-state functions dependent on the program counter and on the stack pointer.

Additionally or alternatively, replacing the program variables includes eliminating the references to the program variables from the next-state functions, so that the finite-state model is substantially independent of data values of the program variables.

Further additionally or alternatively, processing the source code further includes expressing the next-state functions with reference to a stack used in running the code, and restricting the next-state functions includes limiting the stack to a depth no greater than a predetermined maximum. Preferably, expressing the next-state functions includes expressing the next-state functions in terms of a stack pointer associated with the stack, and limiting the stack includes limiting the stack pointer to a value no greater than the predetermined maximum. Most preferably, expressing the next-state functions in terms of the stack pointer includes incrementing the stack pointer in response to a function call in the source code, up to the predetermined maximum, and decrementing the stack pointer when the function returns.

Preferably, verifying the finite-state model includes checking the finite-state model against a specification using a model checker. Most preferably, restricting the next-state functions includes automatically producing the model from the source code in a form suitable for processing by the model checker, substantially without human intervention in deriving and restricting the next-state functions or in replacing the references. Further preferably, checking the finite state model includes checking the model against one or more formulas expressed in terms of temporal logic, and finding a counter-example indicative of the error.

There is also provided, in accordance with a preferred embodiment of the present invention, apparatus for verifying software source code that includes references to program variables, the apparatus including a program analyzer, which is arranged to process the source code so as to derive a set of next-state functions representing control flow of the source code and to replace the references to the program variables in the source code with non-deterministic choices in the next-state functions, and further to restrict the next-state functions including the non-deterministic choices to produce a finite-state model of the control flow, which can be checked by a model checker to find an error in the source code.

There is additionally provided, in accordance with a preferred embodiment of the present invention, a computer software product for verifying source code that includes references to program variables, the product including a computer-readable medium in which program instructions are stored, which instructions, when read by the computer, cause the computer to process the source code so as to derive a set of next-state functions representing control flow of the source code and to replace the references to the program variables in the source code with non-deterministic choices in the next-state functions, and further cause the computer to restrict the next-state functions including the non-deterministic choices to produce a finite-state model of the control flow, which can be checked by a model checker to find an error in the source code.

The present invention will be more fully understood from the following detailed description of the preferred embodiments thereof, taken together with the drawings in which:

DETAILED DESCRIPTION OF PREFERRED EMBODIMENTS

Figure 1:
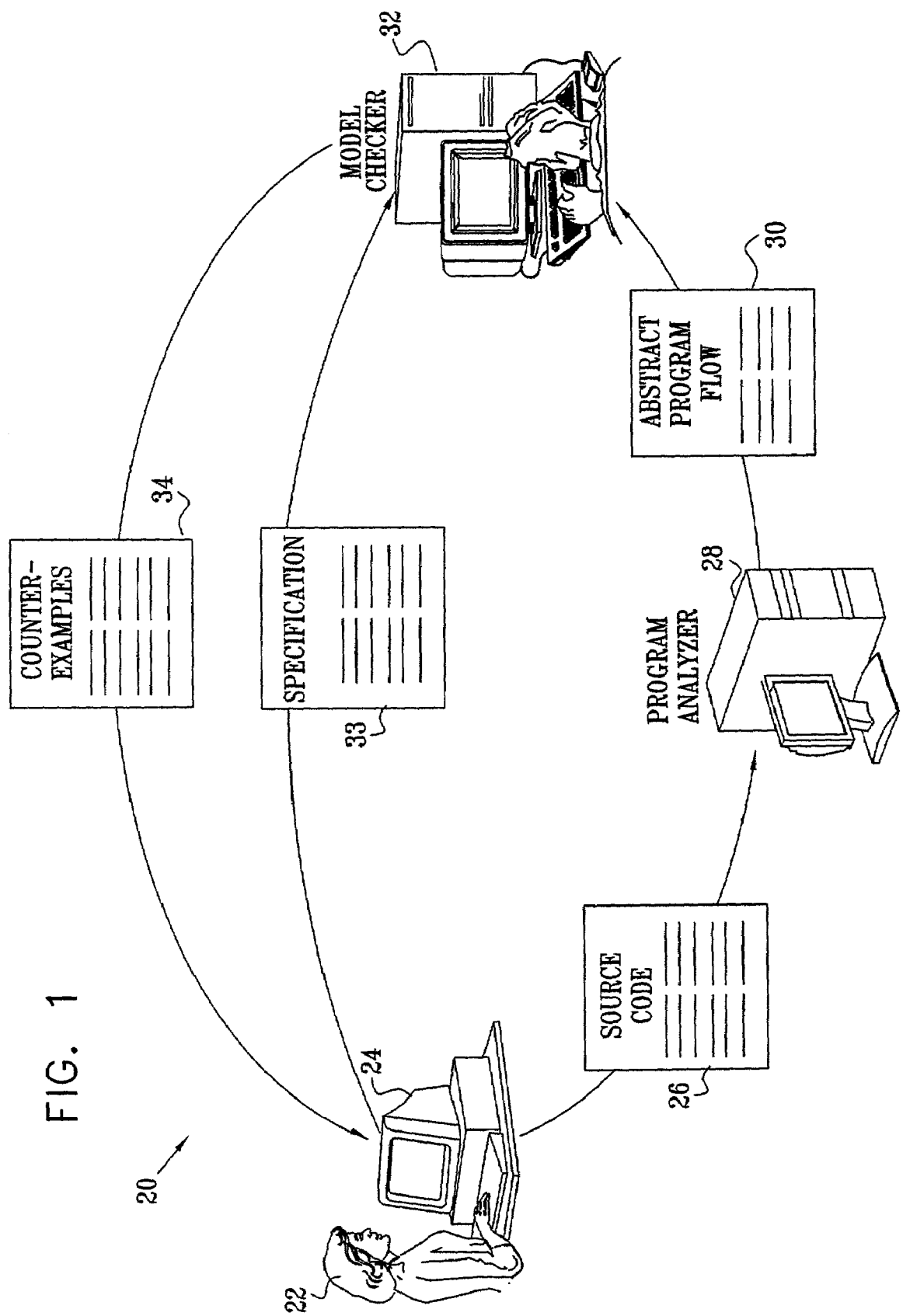
FIG. 1 is a schematic, pictorial illustration showing a system for software development and verification, in accordance with a preferred embodiment of the present invention.

FIG. 1 is a schematic, pictorial illustration showing a system 20 for software development and verification, in accordance with a preferred embodiment of the present invention. A programmer 22, using a programming station 24, develops software source code 26, typically in a high-level language, such as C or Java. A program analyzer 28 automatically processes the source code to convert it into a form amenable to model checking, as described in detail hereinbelow. Analyzer 28 outputs a skeleton program 30 in a model checking language, preferably SMV or a variant thereof, which represents the abstract control flow of source code 26, without variables and with a stack of finite depth.

Skeleton program 30 is input to a model checker 32, such as the above-mentioned IBM RuleBase. The model checker checks skeleton program 30 (the model) against a specification 33, which is typically prepared by programmer 22 or by a verification engineer. Preferably, the specification is expressed in a temporal logic language, such as CTL or, most preferably, RCTL/Sugar, as described by Beer et al. in the articles cited in the Background of the Invention. Specification 33 is made up of formulas, as are known in the model checking art, which describe a computation sequence and a condition that is required to hold in some or all of the states of the sequence. Alternatively or additionally, other formula types may be used in checking skeleton program 30. When one of the formulas in specification 33 is not satisfied by program 30, model checker 32 returns a counter-example 34 to programmer 22 showing the computation path that led to violation of the required condition.

Programming station 24, program analyzer 28 and model checker 32 preferably comprise general-purpose computers with suitable software for carrying out their respective functions. This software may be downloaded to the respective computers in electronic form, over a network, for example, or it may alternatively be provided on tangible media, such as optical or magnetic disks. Although station 24, analyzer 28 and model checker 32 are shown, for the sake of clarity, as separate units, the functions of these units may be carried out together by a single processor with suitable software.

Figure 2:
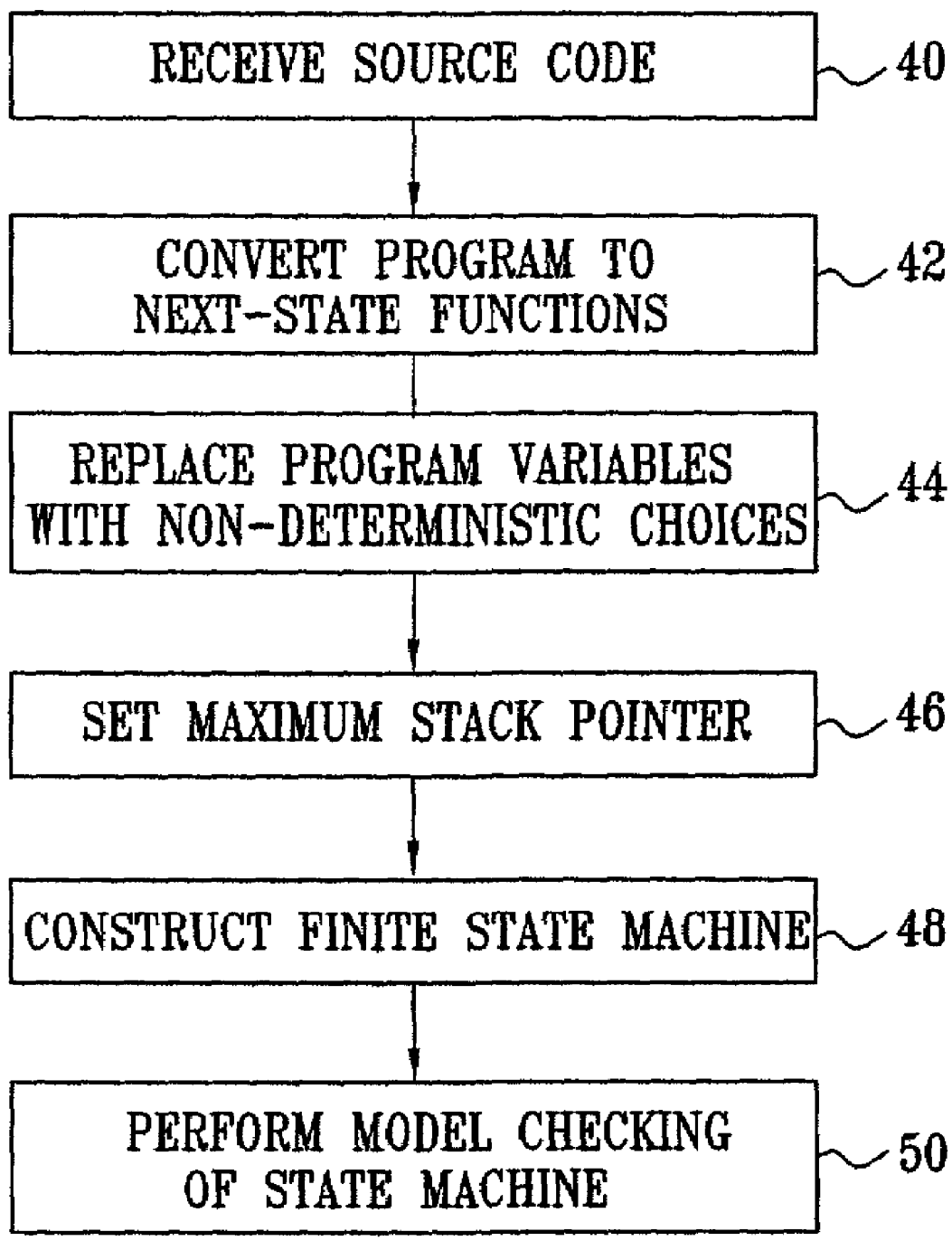
FIG. 2 is a flow chart that schematically illustrates a method for software verification, in accordance with a preferred embodiment of the present invention.

FIG. 2 is a flow chart that schematically illustrates a method for processing and verifying source code 26 in system 20, in accordance with a preferred embodiment of the present invention. For the sake of example, this method is described here with reference to a sample C language program doit(), which calls a function getmax(), as listed in Table I below:

TABLE I

SAMPLE SOURCE CODE

|   | |
|---|---|
|   | getmax () { |
|   | int max, a; |
| 0 | a = max = 0; |
| 1 | do { |
| 2 | if (a > max) |
| 3 | max = a; |
| 4 | a = input(); |
| 5 | } while (a); |
| 6 | return (max); |
| 7 | } |
|   | doit () { |
|   | int max; |
| 8 | max = getmax(); |
| 9 | } |

This source code program 26 is input to program analyzer 28 at a receive source step 40. Analyzer 28 begins converting program 26 to finite state machine form by representing the program as a set of next-state functions, at a next-state generation step 42. The conversion is facilitated by extracting the program counter (pc), shown in the leftmost column of Table I. The next-state functions generated by analyzer 28 describe the state transitions of each of the program variables, max and a, and of pc as a function of one another. This decomposition is shown in Table II below with respect to the function getmax():

TABLE II

NEXT-STATE FUNCTION REPRESENTATION

| next (a) = | if pc = 0 then 0 |
|---|---|
|  | else if pc = 4 then {0, 1, 2, 3} |
|  | else a |
| next (max) = | if pc = 0 then 0 |
|  | else if pc = 3 then a |
|  | else max |
| next (pc) = | if pc = 0 then 1 |
|  | else if pc = 1 then 2 |
|  | else if pc = 2 then if a > max then 3 else 4 |
|  | else if pc = 3 then 4 |
|  | else if pc = 4 then 5 |
|  | else if pc = 5 then if a then 1 else 6 |
|  | else if pc = 6 then 7 |
|  | else if pc = 7 then 7 |

The call to input a at pc=4 in the sample program (Table I) is interpreted by analyzer 28 as a non-deterministic assignment to a of the arbitrary values {0,1,2,3}. (These values are in any case eliminated in the next step of the method, and the range used is therefore unimportant.) All the other function values are assigned by analyzer 28 deterministically, based on the control flow of the program. Treatment of function calls and handling of the program stack, which is based on standard principles of compiler design, are shown below in Table III. These elements can be used to deal with recursive paths, as well.

After constructing the next-state functions to represent the program counter and variables, analyzer 28 models the entire program by replacing the program variables with non-deterministic choices, at a variable replacement step 44. The stack to be used in the model is limited to a finite depth, by setting a maximum stack pointer value max_stackp, at a stack limiting step 46. These elements are used in constructing skeleton model 30 so as to represent the control flow of the entire program in the form of a finite state machine, at a state machine building step 48. The skeleton model is based on the next-state functions determined at step 42, but the variables are abstracted out entirely. The value chosen for max_stackp determines the number of states that the model may include. As this value increases, the behavior of the model increasingly approaches that of the original source program 26, with its effectively infinite state space.

For the sample program shown in Table I, model 30 derived at step 48 has the following form:

TABLE III

ABSTRACT STATE MACHINE REPRESENTATION

| | |
|---|---|
| next (pc) = | if pc = 0 then 1 |
| | else if pc = 1 then 2 |
| | else if pc = 2 then if {0, 1} then 3 else 4 |
| | else if pc = 3 then 4 |
| | else if pc = 4 then 5 |
| | else if pc = 5 then if {0, 1} then 1 else 6 |
| | else if pc = 6 then stack (stackp-1) |
| | else if pc = 7 then 7 |
| | else if pc = 8 then 0 |
| | else if pc = 9 then 9 |
| next (stackp) = | if pc = 8 then stackp_inc |
| | else if pc = 6 then stackp_dec |
| | else stackp |
| next(stack(stackp)) = | if pc = 8 then 9 |
| | else stack(stackp) |
| stackp_inc = | if (stackp = max_stackp) then stackp |
| | else stackp + 1 |
| stackp_dec = | if stackp = 0 then stackp else stackp-1 |
| invar stackp < = | max_stackp |

In the listing above, all references to the variables a and max are removed. The reference to a at pc=2 is replaced by the non-deterministic choice {0,1}. Setting the stack pointer invariantly to be no greater than max_stackp causes stack pointer values above this limit to be ignored. Function calls (as at pc=8 in the source program) cause the stack pointer to be incremented by stackp_inc, up to the permitted maximum. Returns (as at pc=6) cause the stack pointer to be decremented by stackp_dec. The stack itself, however, is an abstract entity, indicative only of the program control flow, since there are no local variable values to be saved on the stack. Again, all these elements of skeleton program 30 are extracted automatically from source code 26, and the behavior of the stack is modeled using methods of compiler design known in the art, while applying the principles of the present invention to abstract out the variables from the program. Propositions assignto_v and useof_v are automatically generated for each variable v, and a proposition callto_f is automatically generated for each function f.

Skeleton program 30, in the form shown in Table III above, is a complete SMV program, which is suitable for verification by model checker 32. The skeleton program is checked against specification 33, at a model checking step 50. Typically, the specification makes use of the propositions that are generated for each variable and function, as described above. Counter-examples 34 are returned to programmer 22 when violations of the specification are encountered. Because of the abstraction inherent in the skeleton program, it is not possible to check all pertinent formulas that could be included in specification 33. The model checker may thus fail to identify certain errors in source code 26 on the one hand, and may provide some incorrect counter-examples 34 on the other. Nevertheless, model checker 32 can still detect many program flow errors.

For example, the inventors have used the methods described hereinabove to verify a C language program that includes a garbage collection mechanism. After memory has been allocated by a running program to hold data objects, garbage collection is used to free the memory when the data objects are no longer needed by the program. Once the memory has been freed by garbage collection, it can be reallocated to other objects. If the program does not release the memory at the proper time, "memory leaks" can result, causing needless blowup in the program's memory requirements. On the other hand, premature release of a data object will cause the corresponding memory location to be freed by garbage collection, whereupon the running program will be left with a bad pointer, indicating a memory location that may no longer contain the proper data. To verify the garbage collection mechanism, the program was modeled as a control flow skeleton and then was checked against formulas expressing the following propositions:

(1) There are no bad pointers in the program, or conversely, if a variable is not saved before garbage collection, and is then used in a calculation after the garbage collection and before a new value has been assigned, a bad pointer error has occurred.

(2) There are no memory leaks, or conversely, if the value of a variable is saved, and then another value is assigned to the variable without first releasing the memory used to save the old value, a memory leak error has occurred.

Such errors are notoriously difficult to find using conventional debugging tools known in the art. The IBM RuleBase model checker was able to identify eight previously undetected errors of this sort in a program under development.

Although preferred embodiments are described herein with reference to certain specific programming languages, model checking tools and types of temporal logic, the principles of the present invention may similarly be applied using other languages, tools and modes of logical representation, as are known in the model checking art. Furthermore, the methods for abstraction of software code described here may be extended, mutatis mutandis, for use in other areas of software development and verification, including verification of assembly code and disassembled object code. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for verifying software source code that includes references to program variables, the method comprising: processing the source code to derive a set of next-state functions, expressed with reference to a stack pointer associated with a stack used in running the code, and representing the control flow of the source code; replacing the references to the program variables in the source code with non-deterministic choice in the next-state functions; restricting the next-state functions including the non-deterministic choices, by limiting the stack pointer to a value no greater than a predetermined maximum, to produce a finite-state model of the control flow, wherein replacing the references to the program variables comprises eliminating the references to the program variables from the next-state functions, so that the finite-state model is independent of data values of the program variables; and verifying the finite-state model to find an error in the source code.

2. A method according to claim 1, wherein processing the source code comprises extracting a program counter from the source code, and expressing the next-state functions in terms of the program counter.

3. A method according to claim 2, wherein replacing the program variables comprises eliminating all the references to the program variables from the next-state functions, leaving the next-state functions dependent on the program counter and on the stack pointer.

4. A method according to claim 1, wherein processing the source code further comprises expressing the next-state functions with reference to a stack used in running the code, and wherein restricting the next-state functions comprises limiting the stack to a depth no greater than a predetermined maximum.

5. A method according to claim 4, wherein expressing the next-state functions comprises expressing the next-state functions in terms of a stack pointer associated with the stack, and wherein limiting the stack comprises limiting the stack pointer to a value no greater than the predetermined maximum, and
wherein expressing the next-state functions in terms of the stack pointer comprises incrementing the stack pointer in response to a function call in the source code, up to the predetermined maximum, and decrementing the stack pointer when the function returns.

6. A method according to claim 1, wherein verifying the finite-state model comprises checking the finite-state model against a specification using a model checker.

7. A method according to claim 6, wherein restricting the next-state functions comprises automatically producing the model from the source code in a form suitable for processing by the model checker, without human intervention in deriving and restricting the next-state functions or in replacing the references.

8. A method according to claim 6, wherein checking the finite state model comprises checking the model against one or more formulas expressed in terms of temporal logic.

9. A method according to claim 6, wherein checking the finite state model comprises finding a counter-example indicative of the error.

10. Apparatus for verifying software source code that includes references to program variables, the apparatus comprising a program analyzer, which is arranged to process the source code so as to derive a set of next-state functions, expressed with reference to a stack pointer associated with a stack used in running the code, and representing control flow of the source code; and to replace the references to the program variables in the source code with non-deterministic choices in the next-state functions, and further to restrict the next-state functions including the non-deterministic choices, by limiting the stack pointer to a value no greater than a predetermined maximum, to produce a finite-state model of the control flow, which can be checked by a model checker to find an error in the source code, wherein the program analyzer is arranged to remove the references to the program variables from the next-state functions, so that the finite-state model is independent of data values of the program variables.

11. Apparatus according to claim 10, wherein the program analyzer is arranged to extract a program counter from the source code, and to express the next-state functions in terms of the program counter.

12. Apparatus according to claim 11, wherein the program analyzer is further arranged to eliminate all the references to the program variables from the next-state functions, leaving the next-state functions dependent on the program counter and on the stack pointer.

13. Apparatus according to claim 10, wherein the program analyzer is arranged to express the next-state functions with reference to a stack used in running the code, which is limited to a depth no greater than a predetermined maximum, and
wherein the next-state functions are expressed in terms of a stack pointer associated with the stack, and wherein the stack pointer is limited to a value no greater than the predetermined maximum.

14. Apparatus according to claim 13, wherein in the next-state functions, the stack pointer is incremented in response to a function call in the source code, up to the predetermined maximum, and is decremented when the function returns.

15. Apparatus according to claim 10, and comprising a model checker, which is arranged to check the finite-state model against a specification.

16. Apparatus according to claim 15, wherein the program analyzer is arranged to automatically produce the model from the source code in a form suitable for processing by the model checker, without human intervention in deriving and restricting the next-state functions or in replacing the references.

17. Apparatus according to claim 15, wherein the model checker is arranged to check the model against one or more formulas expressed in terms of temporal logic.

18. Apparatus according to claim 15, wherein the model checker is arranged to find a counter-example indicative of the error.

19. A computer software product for verifying source code that includes references to program variables, the product comprising a computer-readable medium in which program instructions are stored, which instructions, when read by the computer, cause the computer to process the source code so as to derive a set of next-state functions, expressed with reference to a stack pointer associated with a stack used in running the code, and representing control flow of the source code; and to replace the references to the program variables in the source code with non-deterministic choice in the next-state functions, and further cause the computer to restrict the next-state functions including the non-deterministic choices, by limiting the stack pointer to a value no greater than a predetermined maximum, to produce a finite-state model of the control flow, which can be checked by a model checker to find an error in the source code, wherein the instructions cause the computer to remove the references to the program variables from the next-state functions, so that the finite-state model is independent of data values of the program variables.

20. A product according to claim 19, wherein the instructions cause the computer to extract a program counter from the source code, and to express the next-state functions in terms of the program counter.

21. A product according to claim 20, wherein the instructions cause the computer to eliminate all the references to the program variables from the next-state functions, leaving the next-state functions dependent on the program counter and on the stack pointer.

22. A product according to claim 19, wherein the instructions cause the computer to express the next-state functions with reference to a stack used in running the code, which is limited to a depth no greater than a predetermined maximum.

23. A product according to claim 22, wherein the next-state functions are expressed in terms of a stack pointer associated with the stack, and wherein the stack pointer is limited to a value no greater than the predetermined maximum, and wherein the next-state functions are expressed in terms of a stack pointer associated with the stack, and wherein the stack pointer is limited to a value no greater than the predetermined maximum.

24. A product according to claim 19, wherein the instructions further cause the computer to check the finite-state model against a specification.

25. A product according to claim 24, wherein the instructions cause the computer to automatically produce the model from the source code in a form suitable for checking against the specification, without human intervention in deriving and restricting the next-state functions or in replacing the references.

26. A product according to claim 24, wherein the instructions cause the computer to check the model against one or more formulas expressed in terms of temporal logic.

27. A product according to claim 24, wherein the instructions cause the computer to find a counter-example indicative of the error.

* * * * *